Dec. 11, 1934.  F. SEAVER  1,983,681
SAUSAGE TREATING METHOD
Filed Dec. 24, 1931
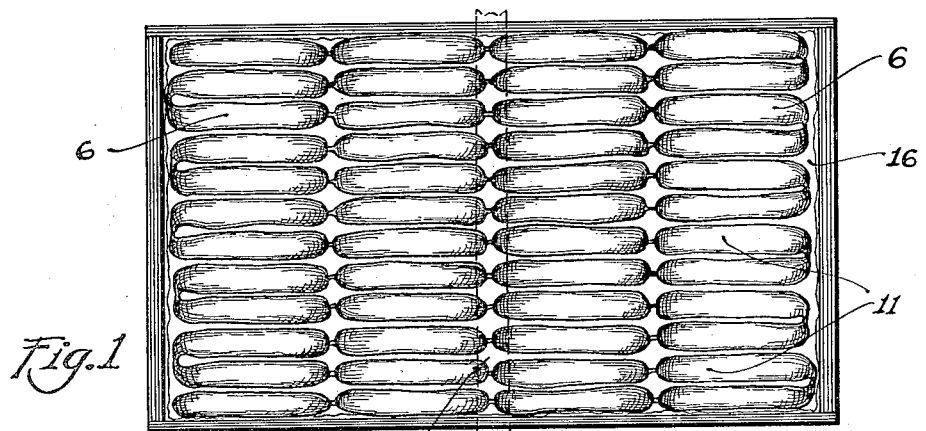
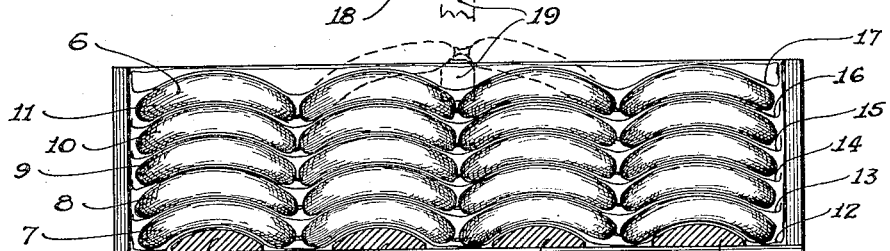
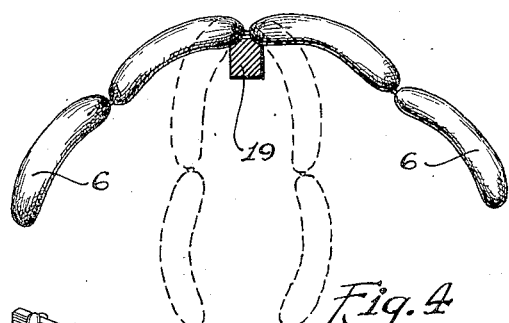
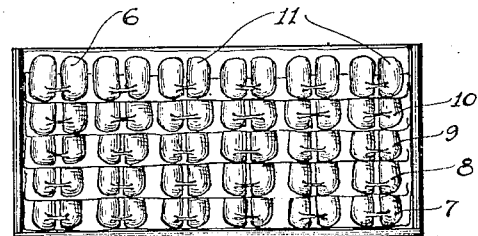
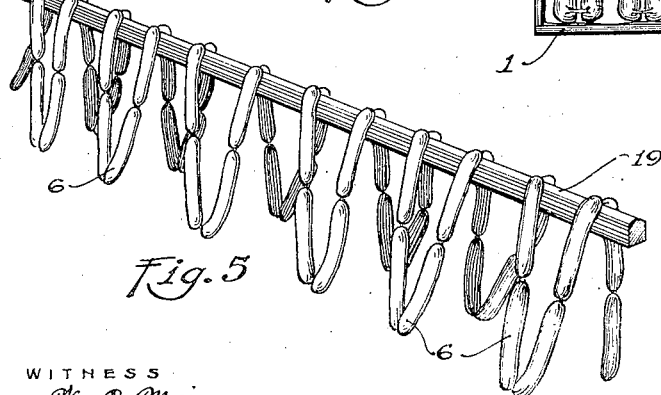
Floyd Seaver, INVENTOR
BY ATTORNEY
WITNESS Patented Dec. 11, 1934

1,983,681

UNITED STATES PATENT OFFICE 1,983,681

SAUSAGE TREATING METHOD

Floyd Seaver, Chicago, Ill., assignor to Swift and Company, Chicago, Ill., a corporation of Illinois Application December 24, 1931, Serial No. 582,906

4 Claims. (Cl. 99—11)

This invention relates to methods of treating and handling sausage product. For example, such sausage products as Frankfurters. One of the objects of this invention is to provide a method for the treatment of sausage products, such as Frankfurters, which will permit the manufacture of the sausage product, insofar as it may be done, at a central packing plant and the completion of the operation at or near the point of distribution. Another object of the invention is to provide a method of treating sausage product such as Frankfurters, for example, which may be advantageously used in the practice of the invention, described and claimed in my co-pending application entitled "Method of smoking Frankfurters", Serial No. 560,389, filed August 31, 1931.

Another object of the invention is to provide a method of packing Frankfurters in packing boxes such that they may be hung for smoking by inexperienced operators. Other objects of the invention will be apparent from the description and the claims which follow.

The conventional method of producing such sausage products as Frankfurters involves first comminuting the meat products, thereafter stuffing the meat product into the casing and linking the product in the ordinary way.

Since sausage products are perishable it is desirable to complete the processing as quickly as can be done. Consequently, after the stuffing operation the sausages are smoked, cooked and artificially colored, if desired, as promptly as possible. After the product has chilled sufficiently, it is packed into suitable containers for transportation, mainly in refrigerator cars, to distant branch houses or to dealers. It is well known that this ordinary treatment and method of handling sausage products such as Frankfurters, for example, leads to considerable uncertainty as to the quantity that may be required each day in order to supply the demands of the sales outlets. It will be appreciated as well of course that distant sales points will quite often be unable to exactly anticipate their requirements. This is particularly true of distant sales points or outlets that, due to transportation facilities and the like, receive but one shipment each week. If such is the case it will naturally result in product more or less aged being placed upon the market. In preparing sausage for shipment in the conventional manner, it is necessary to process it in the smoke house to a degree, for the sake of preservation. This renders it less palatable than sausage could be made if it were prepared for prompt, local consumption. Even though it is possible to make the product from meats which are of the minimum age, in the handling and curing, it is not always possible to market the sausage in a strictly fresh condition.

The present invention renders it possible to maintain the advantage of manufacturing the product at the point where the meats are produced or at a central manufacturing plant and thereafter prepared for transportation, holding it at the branch house or sales outlet for example, for further processing at a time when it is required for sale, and in this manner supply the consumer with a freshly processed sausage product, which freshly processed product has distinct advantages, such as tender casings, juiciness and better flavor.

In practicing the present invention immediately following the stuffing operation, instead of hanging on suitable sticks for smoking as is done in the conventional process, which has already been described, the product is arranged in a container designed especially for this purpose. This container, of a proper size for Frankfurters, is equal to four times the length of the individual links of sausage and is of a width to hold exactly the number of Frankfurters required for a designated length of smoke stick, when such Frankfurters have been properly spaced for smoking. The depth of the package may be varied at will to provide for as many layers as may be considered desirable.

Referring now to the drawing:

Figure 1 is a plan view of the container shown, for example, in Figure 2, with the cover and top protecting layer of paper removed.

Figure 2 is a side view of a container properly packed in accordance with the teachings of this invention. One side of the container being removed to show the Frankfurters.

Figure 3 is an end view of a filled container with the end wall removed.

Figure 4 is a detail showing the manner of hanging Frankfurters on a stick.

Figure 5 is a perspective view showing a string of Frankfurters properly hung upon a conventional smoke stick.

Referring now more particularly to Figure 1. A container 1 is provided. In the particular package shown in the drawing, four strips are placed in the bottom of the container as 2, 3, 4 and 5. It will be noted that the Frankfurters 6 are arranged in layers as 7, 8, 9, 10 and 11.

The several layers are separated and protected by sheets of paper as 12, 13, 14, 15, 16 and 17.

The paper may, of course, be in one continuous strip placed in the box as the successive layers of Frankfurters are packed therein.

The strips 2, 3, 4 and 5 in the bottom of the package act as a support for the Frankfurters. It will be noted that the strips are somewhat narrower than the length of the individual links of sausage and arched to a degree equal to the natural curve of the casings used for stuffing the product.

In the actual packing operation, in carrying out this invention, the container is lined with suitable paper of a waxed or oiled type to prevent adherence of the product while in the frozen state. The sausages are linked in the usual way well known in the industry, in the desired length, and are placed in the container by the operator, who lays them in rows of four links each from one end of the box to the other, the arched side upward following the contour of the arched supports, 2, 3, 4 and 5, reversing the motion so that the second group of four links forming the chain will run in the opposite direction. This procedure is followed until the entire layer has been completed. Each row of the layer is held compactly against the adjoining row by means of the close packing and without the necessity of having dividers between such rows. The end of one string of links is tied to another where two ends occur, throughout the layer. In this manner each layer then comprises one continuous string of links.

Over this layer of product is placed a waxed, oiled or other suitable paper divider, following which a second layer is packed in the same manner, this being repeated until the package is completely filled to the top.

Following this the ends of the liners are folded over, the cover placed on the package and the package containing the product placed into a sharp freezer, preferably provided with a rapid chilling unit operating at zero to 10 degrees below or even lower for a time sufficient to thoroughly freeze the product in the package. A suitable rapid chilling unit for use in this connection is the one described in my co-pending application entitled "Mechanism for processing food stuffs", Serial No. 376,800, filed July 8, 1929.

It is desirable to quickly freeze the product and of course any suitable means may be used to bring about this purpose. After the product is frozen the package is ready for storage or shipment. Provision should of course be made to avoid the thawing of the product during transit.

Upon arrival of the product at destination, the product should be stored in a freezing temperature in order to keep it in perfect condition. When it is desired to produce smoked Frankfurters the product may be removed from the packages in the following manner: After removing the cover and the top liners of the package, and by using a cloth wrung out in warm water for example, or a brush dipped into warm water the twisted portion of the casings connecting the links may be thawed almost instantly, rendering them sufficiently pliable to handle without breaking, and in the meantime the links remain in a frozen state.

By raising a layer, for example, layer 11 at 18 such that two rows of links are to the right of the break and two rows to the left, a smoke stick as 19 may be placed under the entire layer, following this the layer is removed by lifting the smoke stick 19. Frankfurters in this manner are properly hung for smoking, except of course for the spacing between the links. After a delay of one or two minutes, during which time the other layers of the package are being removed, the links may be separated at the point where they have been frozen in contact with each other.

Following this the product may be spread with proper spacing for smoking on the smoke stick 19, this being done while the twist between the links is in a thawed and flexible state, and while each Frankfurter is still frozen to such a degree that there is no danger of breaking the casing or otherwise injuring the product. Placing the product into the smoking chamber while in a frozen condition is as an aid to maintaining a moist casing and properly preparing the product for smoking in accordance with the teachings in my first mentioned co-pending application, Serial No. 560,389.

After smoking, the final cooking and/or coloring as the case may be, may be done in the usual manner. It may be readily seen that this method involves the very distinct advantage of permitting the regulation of the work of a manufacturing crew so that steady daily employment may be provided without the usual layoff which would, of course, result in the normal handling of sausage when the supply and demand cannot be properly adjusted. The method of packing the boxes or containers which has been described, provides an economical method as well as a compact package for freezing and transporting, while the method of removing from the package by thawing only the twisted portion of the casing promotes a class of workmanship in respect to handling at the destination that could not possibly be equalled were the product to be fully thawed prior to hanging on the smoke stick. This is due to the fact that hanging for smoking is a skilled occupation and the proper spacing of the Frankfurters upon a smoke stick is a task that requires practice to learn properly. My method permits the use of unskilled labor in arranging the Frankfurters upon the smoke stick. In the case of products of the smoked or the cooked type or product which is both cooked and smoked, other than Frankfurters or similar product in very small casings, the method of handling is the same, except that the container in which the product is packed for freezing and for transportation must be adapted to the particular form of product being packed.

I claim and desire to secure by Letters Patent, the following:

1. The method of treating sausage comprising stuffing, linking, packing in containers, freezing while in said containers, thereafter de-frosting the twisted connecting portions of the sausage casing sufficiently to permit hanging upon a smoke stick while maintaining the sausage in a frozen condition and subsequently smoking.

2. The process of packing Frankfurters in a container which comprises placing said Frankfurters in a plurality of layers, each layer consisting of a plurality of rows, all the Frankfurters in the entire layer being linked into a single string, and supporting the bottom layer of Frankfurters between their ends throughout an arc corresponding to the natural curvature of the casings of the Frankfurters.

3. The process of packing sausages in a container which comprises placing said sausages in a plurality of layers, each layer consisting of a plurality of rows, all the sausages in the entire layer being linked into a single string of the exact number of sausage for a designated length of smoke stick and in smoke stick receiving arrangement to permit a smoke stick to be passed beneath a complete layer for lifting the layer from the container and for simultaneously arranging the sausage on the smoke stick, and supporting the bottom layer of Frankfurters between their ends throughout an arc corresponding to the natural curvature of the casings of the Frankfurters.

4. A sausage package comprising a container, unsmoked linked sausage in said container in a plurality of layers, each layer consisting of a plurality of rows, all the links in each entire layer being linked into a single string of the number of individual links desired for an individual length of smoke stick, said container having in the bottom thereof, a plurality of strips somewhat narrower than the individual links of sausage and arched to a degree equal to the natural curve of the casings used for stuffing the product thereby providing a support therefor and preventing distortion thereof.

FLOYD SEAVER.